3,356,711
5-AMINOTRIHALOPHENYLACETIC ACIDS AND DERIVATIVES
Edward D. Weil, Lewiston, and Edwin Dorfman, Grand Island, N.Y., assignors to Hooker Chemical Corporation, Niagara Falls, N.Y., a corporation of New York
No Drawing. Filed Feb. 20, 1963, Ser. No. 260,079
17 Claims. (Cl. 260—471)

This is a continuation-in-part of our parent application Ser. No. 839,299, filed Sept. 11, 1959, now abandoned.

This invention relates to new compositions of matter and to methods of preparing and using them. More specifically, this invention resides in the new composition of matter aminotrihalophenylacetic acid and its salts, wherein the halogen is selected from the group consisting of chlorine, bromine and mixtures thereof. Such products have unique properties as selective herbicides which properties are not logically predictable from known properties of other compounds in their series.

The substances of the invention can be prepared as illustrated below:

The nitro group of 5-nitro-2,3,6-trichlorophenylacetic acid (the preparation of 5-nitro-2,3,6-trichlorophenylacetic acid is given in copending application SN 754,707 now U.S. 3,009,806) is reduced. A preferred method is by hydrogenation in the presence of a nickel catalyst or a noble metal catalyst, although other reductants such as zinc, iron, tin, ferrous hydroxide, or the like, may also be used. The free acid may be converted to a salt by reaction with either a base such as sodium hydroxide, potassium hydroxide, ammonia, an amine, or with an acid such as hydrochloric or sulfuric acid. The utility of the compounds as herbicides does not appear to be very significantly influenced by the particular base or acid used to prepare the salts, and it is believed that these salts may all become converted to the free 5-amino-2,3,6-trichlorophenylacetic acid in the soil. In a similar way, those derivatives of 5-amino-2,3,6-trichlorophenylacetic acid, such as the esters and amides, thereof, which readily hydrolyze to 5-amino-2,3,6-trichlorophenylacetic acid under the mild conditions encountered in moist soil at ambient temperatures, may be employed in place of the free acid to obtain similar results. For economic reasons, we prefer to employ the sodium salt of 5-amino-2,3,6-trichlorophenylacetic acid, or a salt with a simple organic amine such as dimethylamine, such salts being water soluble. The compound of the invention also forms salts with strong acids such as hydrochloric acid, and may be employed in the form of such salts if desired.

It is important in agricultural practice to use a plant growth regulator which will control weeds but which will have little or no adverse effect on the crops in the treated area. One of the most difficult problems in the herbicidal art has been to control both broadleaf weeds and grasses in those crops which are sensitive to chemical herbicides. Such crops include many legumes and vegetables such as soybeans, cotton, lettuce, sweet potatoes, melons, carrots and others. Many prior art herbicides, including 2,4-dichlorophenoxyacetic acid and its salts, cannot be employed in the above-mentioned crops since the crops are readily damaged thereby. Certain chloroacetamides have been utilized to control grassy weeds in such crops, but are lacking in effectiveness on broadleaf weeds. Petroleum oils have had some utility in weeding carrots, but unfortunately these oils apparently lack persistence in the soil and are expensive to use. This technique of using oils also appears limited to weeding of carrot and cotton crops. There is, therefore, a great need in the art for an inexpensive selective compound capable of controlling both broadleaf and grassy weeds without damage to sensitive crops, and having the ability of controlling weeds over a period of many weeks following a single application. Applicants' invention makes available compositions which are inexpensive to use and fills this above long felt need. This invention also makes available new compositions of matter useful as intermediates and biological toxicants. For economic reasons, to avoid a costly separation procedure, we prefer to employ the compound of the invention in the form of a technical mixture with isomeric aminotrichlorophenylacetic acids, which do not detract from the herbicidal activity of the active isomer; and show, in some cases, a slight contributory action thereto, although these others by themselves are inactive.

These other isomers which can be present include the 3-amino-2,4,5-trichloro-, 5-amino-2,3,4-trichloro- and 3-amino-2,4,6-trichlorophenylacetic acid. A particularly preferred mixture because of its low cost is that prepared by nitrating (and then reducing the nitro group to amino) commercial trichlorophenylacetic acid which, being made from the trichlorination product of toluene, contains between about 30 and about 75 percent 2,3,6-trichlorophenylacetic acid, the remainder being the 2,4,5-, 2,3,4- and 2,4,6-trichlorophenylacetic acids. This mixture upon nitration and reduction therefore yields a mixed aminotrichlorophenylacetic acid containing between about 30 and about 75 percent of 5-amino-2,3,6-trichlorophenylacetic acid, the remainder being mostly 3-amino-2,4,5-trichlorophenylacetic acid, 5-amino-2,3,4-trichlorophenylacetic acid and 3-amino-2,4,6-trichlorophenylacetic acid. The salts and esters of the said aminotrichlorophenylacetic acids, analogous to the salts and esters of the pure isomer, may also be employed.

A further object of the invention is to make available new compositions of matter useful as intermediates and biological toxicants.

We have found that 5-amino-2,3,6-trichlorophenylacetic acid and the salts thereof are selective herbicides having the desirable combination of properties outlined previously. These compounds are new compositions of matter and exhibit properties which could not have been logically predicted from the known properties of related compounds. It is furthermore surprising that 5-amino-2,3,6-trichlorophenylacetic acid should have utility for weed control in herbicide sensitive crops since the ordinary herbicidal chlorinated phenylacetic acids are extremely damaging to all of these crops and could not by any means be used for weed control in these crops.

The compounds of the invention may be employed in aqueous solutions or in organic solvents, such as hydrocarbons or alcohols. Solid carriers such as clay, talc, or vermiculite may also be employed. The various formulation adjuvants known to the herbicide art may be employed with these compounds. For example, wetting agents, dispersing agents, emulsifiers, sequestrants, and the like may be used. Also, combinations of these herbicides with other herbicides may be used, for example with N,N-diallyl-α-chloro acetamide, ethyl N,N-dipropyl thiocarbamate, and similar compounds which do not destroy the crop tolerance characteristic of the compounds of the invention, and which can reinforce the herbicidal action toward certain weed species.

The preferred method of application is to apply the chemical to the soil prior to the emergence of crops, however, post-emergence applications are also effective against certain weeds. Rates of 1–8 pounds per acre are preferred.

Suitable salts include those which contain an inorganic or organic cation such as the alkali metals, sodium and potassium, the alkaline earth metals, calcium, strontium, barium, and magnesium considered herein to be in that class, other metals such as aluminum, iron, cobalt, nickel, zinc, cadmium, mercury, copper, and other cations such as ammonium, mono-, di- and tri-hydrocarbyl-substituted ammonium, mono-, di- and tri-alkanolammonium, and mixed alkylalkanolammonium in chemical combination with such number of 5-amino-2,3,6-trichlorophenylacetate anion or anions as is demanded to satisfy valence requirements.

The alkylammonium salts such as monoalkylammonium, dialkylammonium, or trialkylammonium preferably have from 1 to 18 carbon atoms in each alkyl group, the total number of carbon atoms preferably being not more than 18. The alkanolammonium salts such as monoalkanolammonium, dialkanolammonium, or trialkanolammonium preferably have from 2 to 3 carbon atoms in each alkanol group. The mixed alkylalkanolammonium salts such as monoalkyl monoalkanolammonium, dialkyl monoalkanolammonium, or monoalkyl dialkanolammonium preferably have from 1 to 4 carbon atoms in each alkyl group and from 2 to 3 carbon atoms in each alkanol group.

Examples of monoalkylammonium salts are the monomethylammonium, monoethylammonium, monopropylammonium, monobutylammonium, monoamylammonium, monohexylammonium, monoheptylammonium, monooctylammonium, monoonylammonium, monodecylammonium, monoundecylammonium, monododecylammonium, and similar monoalkylammonium salts of 5-amino-2,3,6-trichlorophenylacetic acid.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of 5-amino-2,3,6-trichlorophenylacetic acid.

Examples of trialkylammonim salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, dimethyllaurylammonium, dimethylstearylammonium and similar salts of 5-amino-2,3,6-trichlorophenylacetic acid.

Examples of monoalkanolammonium salts are the monoethanolammonium, monopropanolammonium, and similar salts of 5-amino-2,3,6-trichlonophenylacetic acid.

Examples of dialkanolammonium salts are the diethanolammonium, dipropanolammonium, ethanolpropanolammonium and similar salts of 5-amino-2,3,6-trichlorophenylacetic acid.

Examples of trialkanolammonium salts are the triethanolammonium, tripropanolammonium, ethanoldipropanolammonium, propanoldiethanolammonium, and similan salts of 5-amino-2,3,6-trichlorophenylacetic acid.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar salts of 5-amino-2,3,6-trichlorophenylacetic acid.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar salts of 5-amino-2,3,6-trichlorophenylacetic acid.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar salts of 5-amino-2,3,6-trichlorophenylacetic acid.

Examples of dialkylammonium salts in which the radicals are conjoined to form a ring, are piperidinium, pyrrolidinium and morpholinium salts. Examples of trialkylammonium salts in which the radicals are conjoined to form a ring are N-methylmorpholinium salts. Examples of alkylammonium salts in which the alkyl groups are cycloaliphatic, include cyclohexylammonium and dicyclohexylammonium salts of 5-amino-2,3,6-trichlorophenylacetic acid.

Examples of hydrocarbylammonium salts in which the hydrocarbyl radical is aromatic include the anilinium, the N-methylanilinium, the N,N-dimethylanilinium, the naphthylammonium, and the benzylammonium salts of 5-amino-2,3,6-trichlorophenylacetic acid.

Also the lower alkyl substituted and unsubstituted esters of these acids are included within the scope of this invention, for example, the methyl, ethyl, butyl, lauryl, cyclohexyl, 2-hydroxyethyl, 2-chloroethyl, allyl, phenyl, benzyl, trichlorobenzyl, polychlorophenyl, 1,2-ethylene (bis), glyceryl (mono-, bis- or tris-), methoxyethyl furfuryl, or other esters, as well as thio-analogues of these. These esters are prepared by refluxing the free acids with the alcohols, or by first the acid with thionyl chloride to prepare the acid chloride, and then refluxing with the alcohol to convert the acid chloride to the ester. The thio esters can be prepared by reacting the acid chloride with a mercaptide, or by treating the ordinary ester with $P_2S_5$ in refluxing toluene.

Also, the amides of these said acids are included within the scope of this invention, for example, the simple amide and the N-unsubstituted amides of the acids of the invention. Also, the N-methyl, N,N-dimethyl, N-phenyl, N-hydroxyethyl amides, and the like, as well as the thio-analogues of these. These amides can be prepared by treating the acid chloride with ammonia or an amine. In addition, the anhydrides, and the acid chlorides, the thio anhydrides will hydrolyze to the acids and may be used. The anhydrides or the thio anhydrides are made by adding one-half mole of water of $H_2S$, respectively, to the acid chloride in the presence of two moles of a base, such as pyridine.

While all of these derivatives have herbicidal utility, certain ones are preferred because of high activity and ease of formulation. These preferred derivatives are the free acids, the water-soluble salts, i.e., the alkali metal salts, ammonium, N-(lower alkyl)-substituted ammonium salts (having from 1 to 6 carbon atoms for alkyl group), the mono-, di-, and triethanolammonium salts, the mono-, di-, and tripropanolammonium salts, the N-methylmorpholinium salt; and also the N-unsubstituted amides.

In addition the bromo derivatives of amino-trihalophenylacetic acid and their salts are also embraced within the scope of this invention. Such compounds may include 5-amino-2,3,6-tribromophenylacetic acid and salts thereof, mixed 5-aminotribromophenylacetic acid and salts thereof and mixed halogen derivatives such as 5-aminochlorodibromophenylacetic acid and its salts, and 5-aminodichlorobromophenylacetic acid and its salts.

To further illustrate our invention, the following example are given:

*Example 1.—Preparation of 5-amino-2,3,6-trichlorophenylacetic acid*

A mixture of five parts of weight of 5-nitro-2,3,6-trichlorophenylacetic acid (preparation of which is described in our copending application SN 754,707 now U.S. 3,009,806), ten parts of water, thirty-five parts of methanol, and about two parts of commercial Raney nickel catalyst were agitated under hydrogen at forty p.s.i. for eight hours at 20–30 degrees centigrade. The mixture was filtered, evaporated to dryness, and the residue recrystallized from a benzene-acetone mixture to obtain the desired product as a colorless crystalline solid, M.P. 208–208.5 degrees centigrade.

*Analysis.*—Calc'd for C₈H₆O₂Cl₃N: Cl, 41.8. Found: Cl, 41.4.

The compound is poorly soluble in water, but soluble in aqueous hydrochloric acid to form the soluble hydrochloride and in aqueous sodium hydroxide to form the soluble sodium salt.

Example 2

In the same manner as in Example 1, a mixture of nitrotrichlorophenylacetic acid (prepared by treating technical mixed trichlorophenylacetic acid with excess red fuming nitric acid at 50 degrees centigrade) was hydrogenated to a mixed aminotrichlorophenylacetic acid, a colorless amorphous solid. Infrared examination indicated the presence of about 50 percent of 5-amino-2,3,6-trichlorophenylacetic acid, the remainder being other isomers, principally 5-amino-2,3,4-trichlorophenylacetic acid, 3-amino-2,4,5-trichlorophenylacetic acid, and 3-amino-2,4,6-trichlorophenylacetic acid.

Example 3

A test area was seeded with soybeans, snapbeans, as representative herbicide-sensitive crops, and foxtail, crabgrass, Johnson grass, dock, mustard, and chickweed as representative weeds. The area was then sprayed with 5-amino-2,3,6-trichlorophenylacetic acid at the rate of eight pounds per acre. Soybeans and snapbeans subsequently emerged and grew without injury while each of the above-named weeds was totally controlled. An unsprayed control plot contained a vigorous growth of each of the weed species.

Similar results were obtained by use of the product of Example 2 at 14 pounds per acre.

Example 4.—Preparation of technical trichloronitrophenylacetic acid and trichloroaminophenylacetic acid Fifty parts of a mixed trichlorophenylacetic acid having the approximate isomeric composition forty to fifty percent 2,3,6-, twenty to forty percent 2,4,5-, and ten to twenty percent 2,3,5-trichlorophenylacetic acid (based on infrared analysis of the trichlorotoluenes from which it was derived) was mixed with three hundred and seventy-five parts of red fuming nitric acid and allowed to stand at room tempearture for twenty-four hours. An equal volume of water was then added, the mixture was filtered and washed free of nitric acid. The product was dried in air to a constant weight and was a yellowish, crystalline solid having a neutralization equivalent of 283.5 (theory, 284.5).

*Analysis.*—Calc'd for C₈H₄Cl₃NO₄: N, 4.92; Cl, 37.5. Found: N, 4.5; Cl, 37.0.

This material could be hydrogenated, as in Example 2 to a mixed aminotrichlorophenylacetic acid, a colorless amorphous solid, soluble in aqueous ammonia and caustic soda.

The nitro prdouct was stirred with ten parts of water and to the mixture was added a 20 percent solution of ammonia until a pH of 7–8 was reached, thereby obtaining a clear aqueous solution of the mixed aminotrichlorophenylacetic acid as the ammonium salt. Similarly, the acid was neutralized with aqueous caustic soda to prepare the water-soluble colorless sodium salt, with aqueous dimethylamine to prepare the water-soluble colorless dimethylamine salt, and with diethanolamine to prepare the water-soluble diethanolammonium salt.

The mixed aminotrichlorophenylacetic acid was dissolved in ethyl ether and treated with an ether solution of diazomethane until the color of diazomethane persisted. The methyl esters produced thereby were then resolved by gas chromatography and the various components identified by comparison of their elution times to those of pure isomers. By this means, the composition of the ester mixture (and consequently of the acid mixture) was found to comprise:

| | Percent |
|---|---|
| 5-amino-2,3,6-trichloro-isomer | 40–60 |
| 3-amino-2,4,5-trichloro-isomer | 20–30 |
| 3-amino-2,3,4-trichloro-isomer | 10–15 |

Example 5.—Preparation of the isopropyl ester and the butoxyethyl ester of aminotrichlorophenylacetic acid One hundred parts of mixed isomers of nitrotrichlorophenylacetic acid, containing forty percent 5-nitro-2,3,6-trichloro-isomer by infrared analysis, are refluxed for two hours with two hundred parts of thionyl chloride, then the excess thionyl chloride stripped under aspirator vacuum. The residual liquid acid chloride is added to isopropyl alcohol (two hundred parts), with cooling at twenty-five to thirty-five degrees. After the exothermic reaction ceased, the mixture is refluxed for three hours, then the excess alcohol is stripped under aspirator vacuum. The dark oil is dissolved in four hundred milliliters of fresh isopropyl alcohol and then treated with hydrogen gas in a shaking autoclave at thirty p.s.i. (gauge) in the presence of about five percent by weight of Raney nickel catalyst until no further hydrogen uptake occurs.

The mixture is then filtered to remove catalyst, and the solvent stripped under aspirator vacuum, leaving an amber syrup, part of which crystallizes on prolonged standing. The infrared spectrum shows the presence of the ester linkage and amino group, and the absence of a nitro group.

*Analysis.*—Calc'd for C₁₁H₁₂O₂NCl₃: N, 4.72%. Found: N, 4.6%.

By substituting butoxyethanol (commercial "Butyl Cellosolve") in place of isopropyl alcohol in the above procedure, the butoxyethyl ester is made. It is a viscous oil having the expected functional groups in the infrared spectrum.

*Analysis.*—Calc'd for C₁₄H₁₈O₃NCl₃: N, 3.95%. Found: N, 3.7%.

Although the above examples and description of this invention has been very specifically illustrated, many other modifications will naturally suggest themselves to those skilled in the art upon a reading of this disclosure. These are intended to be comprehended within the scope of this invention.

We claim:

1. A mixture of compounds, selected from the group consisting of:
   (a) aminotrihalophenylacetic acids;
   (b) alkali metal salts of said acids;
   (c) alkaline earth metal salts of said acids;
   (d) the amine hydrochlorides of said acids;
   (e) the ammonium salts of said acids;
   (f) the N-substituted ammonium salts of said acids, selected from the group consisting of:
      (1) mono-, di-, and trialkylammonium salts, wherein said alkyl group(s) has from 1 to 12 carbon atoms;
      (2) mono-, di-, and trialkanolammonium salts, wherein said alkanol group(s) has from 2 to 3 carbon atoms;
      (3) monoalkyl monoalkanolammonium salts, dialkyl monoalkanolammonium salts, and monoalkyl dialkanolammonium salts wherein the alkyl groups have from 1 to 4 carbon atoms and the alkanol groups have from 2 to 3 carbon atoms;
      (4) piperidinium, pyrralidinum, and morpholinium salts;
      (5) N-methylmorpholinium salts;
      (6) cyclohexylammonium and dicyclohexylammonium salts;
      (7) anilinium, N-methylanilinium, N,N-dimethylanilinium, naphthylammonium, and benzylammonium salts;
   (g) the esters of said acids, selected from the group consisting of the methyl ester, the ethyl ester, the butyl ester, the lauryl ester, the cyclohexyl ester, the 2-hydroxyethyl ester, the 2-chloroethyl ester, the allyl ester, the phenyl ester, the benzyl ester, the trichlorobenzyl ester, polychlorophenyl esters, the 1,2-ethylene (bis) ester, glyceryl esters, and the methoxyethyl ester, and the furfuryl ester;
(h) the amides of said acids, selected from the group consisting of the unsubstituted amide, the N-methyl amide, the N,N-dimethyl amide, the N-phenyl amide, and N-hydroxyethyl amides;
wherein the halogens of said compounds are selected from the group consisting of chlorine, bromine, and mixtures thereof, wherein about 30 to about 75 percent of said mixture consists of a compound selected from the group consisting of 5-amino-2,3,6-trihalophenylacetic acid and salts, esters, and amides of 5-amino-2,3,6-trihalophenylacetic acid wherein said salts, esters, and amides are hereinbefore described; and wherein the remainder of said mixture, in addition to the named 30 to 75 percent is comprised respectively of the analogous isomeric 3-amino-2,4,5-trihalophenylacetic acid, 5-amino-2,3,4-trihalophenylacetic acid and 3-amino-2,4,6-trihalophenylacetic acid or the salts or esters or amides of said acids wherein said salts, esters, and amides are as described above.

2. The mixture of claim 1, wherein the 5-amino-2,3,6-trihalophenylacetic acid is 5-amino-2,3,6-trichlorophenylacetic acid.

3. A compound selected from the group consisting of
(a) 5-amino-2,3,6-trichlorophenylacetic acid;
(b) alkali metal salts of said acid;
(c) alkaline earth metal salts of said acid;
(d) the amine hydrochlorides of said acid;
(e) the ammonium salt of said acid;
(f) the N-substituted ammonium salts of said acid, selected from the group consisting of:
  (1) mono-, di-, and trialkylammonium salts, wherein said alkyl group(s) has from 1 to 12 carbon atoms;
  (2) mono-, di-, and trialkanolammonium salts, wherein said alkanol group(s) has from 2 to 3 carbon atoms;
  (3) monoalkyl monoalkanolammonium salts, dialkyl monoalkanolammonium salts; and monoalkyl dialkanolammonium salts wherein the alkyl groups have from 1 to 4 carbon atoms and the alkanol groups have from 2 to 3 carbon atoms;
  (4) piperidinium, pyrrolidinium, and morpholinium salts;
  (5) N-methylmorpholinium salts;
  (6) cyclohexylammonium and dicyclohexylammonium salts;
  (7) anilinium, N-methylanilinium, N,N-dimethylanilinium, naphthylammonium, and benzylammonium salts;
(g) the esters of said acid, selected from the group consisting of the methyl ester, the ethyl ester, the butyl ester, the lauryl ester, the cyclohexyl ester, the 2-hydroxyethyl ester, the 2-chloroethyl ester, the allyl ester, the phenyl ester, the benzyl ester, the trichlorobenzyl ester, the polychlorophenyl esters, the 1,2-ethylene (bis) ester, glyceryl esters, and the methoxyethyl ester, and the furfuryl ester;
(h) the amides of said acid, selected from the group consisting of the unsubstituted amide, the N-methyl amide, the N,N-dimethyl amide, the N-phenyl amide, and N-hydroxyethylamides.

4. The N-substituted ammonium salts of 5-amino-2,3,6-trichlorophenylacetic acid, said salts selected from the group described in claim 3.

5. The esters of 5-amino-2,3,6-trichlorophenylacetic acid, said esters selected from the group described in claim 3.

6. The amides of 5-amino-2,3,6-trichlorophenylacetic acid, said amides selected from the group described in claim 3.

7. 5-amino-2,3,6-trichlorophenylacetic acid.

8. The alkali metal salts of 5-amino-2,3,6-trichlorophenylacetic acid.

9. Sodium 5-amino-2,3,6-trichlorophenylacetate.

10. The ammonium salt of 5-amino-2,3,6-trichlorophenylacetic acid.

11. The dimethylamine salt of 5-amino-2,3,6-trichlorophenylacetic acid.

12. The diethanolammonium salt of 5-amino-2,3,6-trichlorophenylacetic acid.

13. The isopropyl ester of 5-amino-2,3,6-trichlorophenylacetic acid.

14. The butoxyethyl ester of 5-amino-2,3,6-trichlorophenylacetic acid.

15. The methyl ester of 5-amino-2,3,6-trichlorophenylacetic acid.

16. The hydrochloride of 5-amino-2,3,6-trichlorophenylacetic acid.

17. The sulfate of 5-amino-2,3,6-trichlorophenylacetic acid.

References Cited
UNITED STATES PATENTS

| | | | |
|---|---|---|---|
| 2,833,810 | 5/1958 | Kissman et al. | 260—471 |
| 2,894,977 | 7/1959 | Siedel et al. | 260—471 |
| 2,977,212 | 3/1961 | Tischler | 260—558 |
| 3,014,063 | 12/1961 | McLane et al. | 260—518 |
| 3,048,483 | 8/1962 | Weil et al. | 71—2.6 |
| 3,067,253 | 12/1962 | Dietzler et al. | 260—518 |
| 3,073,865 | 1/1963 | Spiegler | 260—518 |
| 3,075,835 | 1/1963 | Fischer | 71—2.6 |

FOREIGN PATENTS

| | | |
|---|---|---|
| 528,115 | 6/1931 | Germany. |

LORRAINE A. WEINBERGER, *Primary Examiner.*

D. D. HORWITZ, *Examiner.*

V. GARNER, *Assistant Examiner.*